United States Patent [19] [11] 4,007,820
Kagata [45] Feb. 15, 1977

[54] WHEEL HUB CLUTCH
[75] Inventor: Tooru Kagata, Toyota, Japan
[73] Assignee: Aisin Seiki Kabushiki Kaisha, Japan
[22] Filed: July 28, 1975
[21] Appl. No.: 599,715
[30] Foreign Application Priority Data
Aug. 6, 1974 Japan .................... 49-90618
[52] U.S. Cl. .................. 192/67 R; 192/89 A; 192/95; 403/1
[51] Int. Cl.² .................... F16D 11/04
[58] Field of Search ....... 192/89 A, 109 A, 67 R, 192/95, 93 A; 403/1

[56] References Cited
UNITED STATES PATENTS

| 3,124,377 | 3/1964 | O'Brien et al. | 192/109 A |
| 3,442,361 | 5/1969 | Hegar | 192/109 A |
| 3,718,213 | 2/1973 | Hegar et al. | 192/109 A |
| 3,753,479 | 8/1973 | Williams | 192/89 A |

Primary Examiner—Benjamin W. Wyche
Attorney, Agent, or Firm—Oblon, Fisher, Spivak, McClelland & Maier

[57] ABSTRACT

In a wheel hub clutching mechanism, a clutch ring to be meshed with a shaft driven pinion is resiliently connected by way of a connecting spring to a follower controlled by turning of a cam. The follower and the clutch ring are pushed toward the lock positions thereof by a compression spring when the cam is turned to its lock position by a manually operated handle and the clutch ring is retracted to the free position thereof together with the follower when the cam is moved to its free position by the handle.

5 Claims, 5 Drawing Figures

WHEEL HUB CLUTCH

BACKGROUND OF THE INVENTION

The present invention relates to a wheel hub clutching mechanism, and more particularly to an improved wheel hub clutching mechanism to couple and uncouple a front wheel hub to and from a driveable front axle to selectively provide four-wheel drive or two-wheel drive.

In such a conventional wheel hub clutching mechanism as disclosed in U.S. Pat. No. 3,753,479 issued on Aug. 21, 1973, when a dial is turned to a lock position it moves an actuator cam to permit a primary strong compression spring to move a clutch element into mesh with the shaft driven pinion and when the dial is moved to a free position it moves the actuator cam to permit a secondary weaker return spring to move the clutch element out of mesh with the pinion. In other words, the weaker return spring is assembled in series with the strong compression spring on a common axis to be stressed when the clutch element is in mesh with the pinion so as to urge the clutch element toward disengagement from the pinion. With this assembling construction, the axial length of the clutching mechanism becomes large and the outer end of the clutching mechanism juts out laterally from the side of the vehicle body when the clutching mechanism is attached to a front wheel hub. Furthermore, in case the biasing force of the weaker return spring is unbalanced with the biasing force of the strong compression spring, engagement and disengagement between the clutch element and the pinion becomes unstable to make rattling noises.

SUMMARY OF THE INVENTION

The main object of the present invention is to provide an improved wheel hub clutching mechanism wherein a clutch ring to be meshed with a shaft driven pinion is resiliently connected by way of a connecting spring to a follower controlled by turning of a cam and wherein the follower and the clutch ring are pushed toward the lock positions thereof by a compression spring when the cam is turned to its lock position by a manually operated handle and the clutch ring is retracted to the free position thereof together with the follower when the cam is moved to its free position by the handle. This improved clutching mechanism is particularly characterized in that the compression spring acts surely to engage the clutch ring with the pinion when the cam is set in its lock position and if there is any preload between the clutch ring and the pinion when the cam is moved to its free position from its lock position the connecting spring is stretched by the follower so that the clutch ring is perfectly disengaged from the pinion by pulling force of the connecting spring after the preload is released.

BRIEF DESCRIPTION OF THE DRAWINGS

Additional objects and advantages of the present invention will be more readily apparent from the following detailed description of a preferred embodiment thereof when taken together with the accompanying drawings in which.

DESCRIPTION OF THE PREFERRED EMBODIMENT

Figure 1:
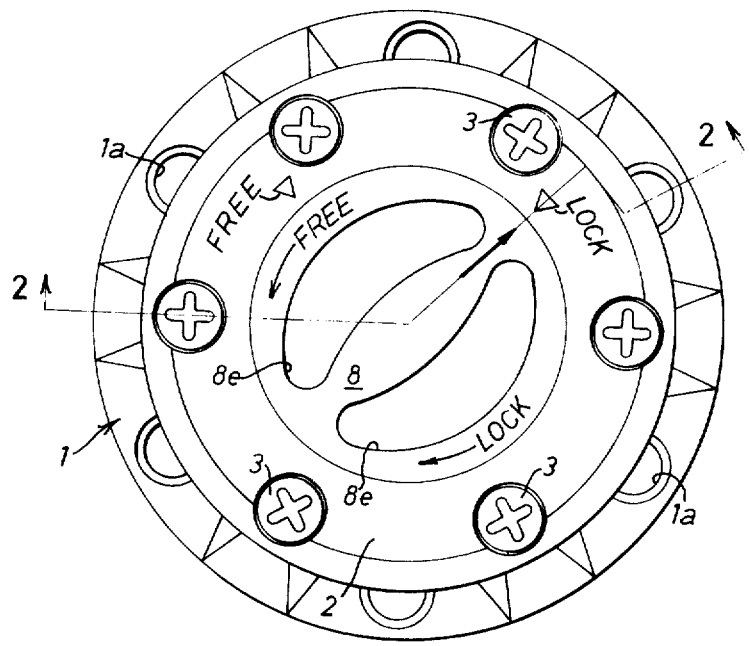
FIG. 1 is a front view of a wheel hub clutching mechanism in accordance with the present invention.

Referring now to the accompanying drawings, there is illustrated a preferred embodiment of a wheel hub clutching mechanism in accordance with the present invention which comprises a body 1 attached to a front wheel hub W of a vehicle by fastening bolts (not shown) threaded thereto through holes 1a and an annular cover 2 fixed to the outer end of the body 1 by fastening screws 3. The body 1 is provided therein with internal spline slots 1b and a bearing portion 1c to support a pinion 4. The pinion 4 is fitted to a splined end portion of a driveable front axle A of the vehicle and includes an external splining 4b to be meshed with a clutch ring 10. This pinion 4 is rotatably mounted in the bearing portion 1c of the body 1 through through means of a metal bushing 5 and is held in its mounted position by a pair of annular snap rings 6 and 7 fixed to the pinion 4.

A manually controlled handle 8 is rotatably mounted in a stepped bore of the annular cover 2 and supported by a snap ring 9 fixed to the inner circumference of the cover 2 to prevent axial movement of the handle 8. An O-ring oil seal 16 between the periphery of the handle 8 and the stepped bore is provided to make waterproof the interior of the body 1. Finger grip recesses 8e shown in FIG. 1 are provided in the face of the handle 8 for manually turning the handle 8 between a lock position and a free position. A detent ball 15 urged by a compressed coil spring 14 drops into notches 2a when the handle 8 is in either the free position or the lock position. The arrow on the face of the handle 8 is aligned with an indication mark for the free position or for the lock position, as shown in FIG. 1.

Figure 2:
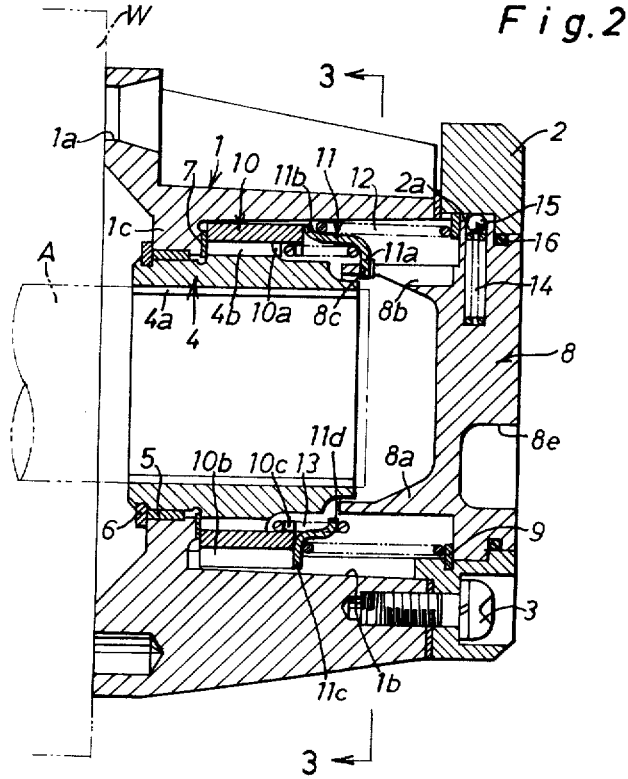
FIG. 2 is a vertical sectional view taken along line 2—2 of FIG. 1.
Figure 3:
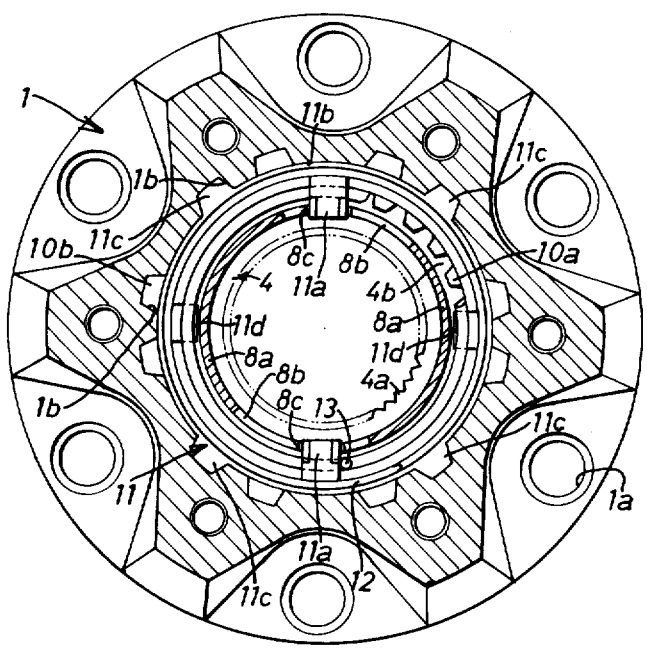
FIG. 3 shows a cross-section of the wheel hub clutching mechanism taken along line 3—3 of FIG. 2.

The handle 8 has a cylindrical boss 8a on which two cam portions 8b are provided to guide a pair of opposed follower tabs 11a formed on an annular follower ring 11. As shown in FIG. 5, the cam portions 8b are respectively provided with two flat engaging faces 8c and 8d to bear the follower tab 11a of the follower ring 11 thereon in the free position or the lock position of the handle 8. The follower ring 11 has four splining lugs 11c which are radially extended from an outer flange 11b of the follower ring 11, as shown in FIG. 3. The splining lugs 11c are guided in the internal spline slots 1b of the body 1 so that turning of the handle 8 from its free position to its lock position permits a compression spring 12 to push the follower ring 11 and the clutch ring 10 from the free positions thereof shown in FIG. 4 to the lock positions thereof shown in FIG. 2.

The compression spring 12 is interposed between the snap ring 9 fixed to the cover 2 and the outer flange 11b of the follower ring 11 to constantly bias the clutch ring 10 through the follower ring 11 inwardly. The follower ring 11 and the clutch ring 10 are resiliently connected to each other by a coil spring 13 which is engaged at its one end with a pair of opposed hooks 11d radially extended from the follower ring 11 and at its other end with a hook portion 10c formed on the clutch ring 10. The clutch ring 10 has an external splining 10b guided in the internal spline slots 1b of the body 1 and an internal splining 10a to be meshed with the external spline teeth 4b of the pinion 4.

Figure 4:
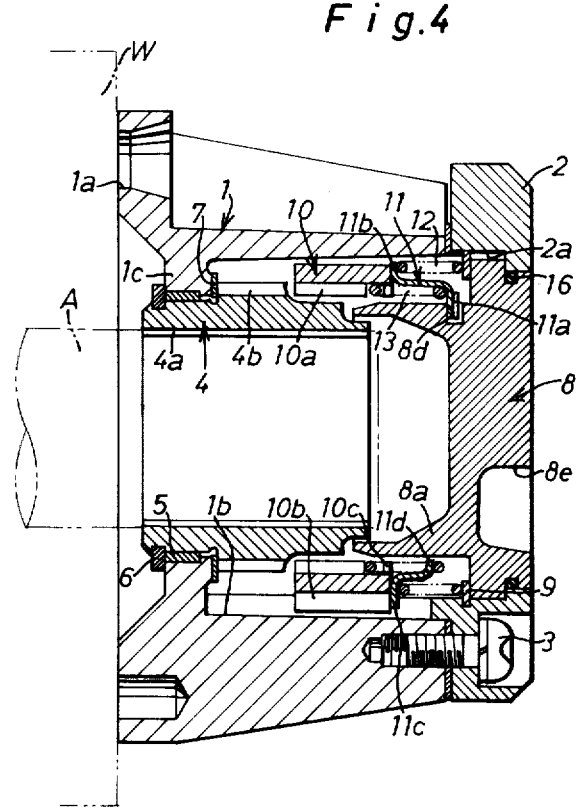
FIG. 4 is a vertical sectional view like FIG. 2 with parts moved for convenience of illustration.
Figure 5:
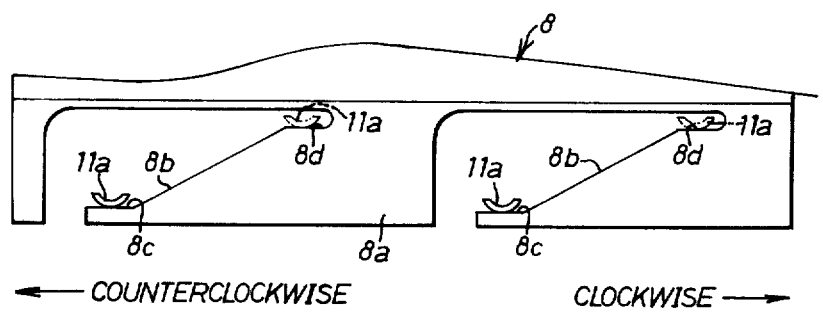
FIG. 5 illustrates a cam portion of the clutching mechanism and part of the associated follower.

To uncouple the front wheel hub from the front axle to provide two-wheel drive of the vehicle, the handle 8 is manually rotated from its lock position to its free position so that counterclockwise rotation of the cam portions 8b retracts the tabs 11a of the follower ring 11 to stress the spring 12 to its compressed condition shown in FIG. 4. This causes the follower ring 11 to pull the clutch ring 10 by way of the connecting spring 13 out of engagement with the pinion 4. Thus, engagement of the clutch ring 10 with the pinion 4 is released to free the front wheel hub as shown in FIG. 4. In case any preload causes friction between the internal splining teeth 10a of the clutch ring 10 and the external splining teeth 4b of the pinion 4, the connecting coil spring 13 will be stretched by the hooks 11d of the follower ring 11 until the preload is released. Thus, as the pinion 4 is rotated a slight amount, the connecting spring 13, being stretched, pulls the clutch ring 10 to permit disengagement of the clutch ring and the pinion 4.

To couple the front wheel hub with the front axle to provide four-wheel drive of the vehicle, the handle 8 is manually rotated from its free position to its lock position so that clockwise rotation of the cam portions 8b for clutch engagement permits the compression spring 12, being in compression, to push the follower ring 11 and the clutch ring 10 from the free positions thereof to the lock positions thereof so as to engage the clutch ring 10 with the pinion 4. In this instance, if the clutch ring 10 and the pinion 4 do not initially mesh, the spring 12 will push the clutch ring 10 into mesh with the pinion 4 as the pinion 4 is rotated a slight amount and maintain the clutch engagement between the pinion 4 and the clutch ring 10.

Having thus described the preferred embodiment of the invention it should be understood that numerous structural modifications and adaptations may be resorted to without departing from the spirit of the invention.

What is claimed is:

1. A wheel hub clutching mechanism comprising:
   a body provided therein with internal splining and to be attached to a wheel hub;
   a pinion journalled within said body to be mounted on a driveable axle and provided thereon with external splining;
   a clutch ring splined to said body and axially movable from a free position in which it is disengaged from said pinion to a lock position in which it is engaged with said pinion;
   a follower ring splined to said body and engaged with said clutch ring;
   a compression coil spring assembled within said body to urge said follower ring toward said clutch ring and urge said clutch toward the lock position;
   manually operated cam means movable in one direction to retract said follower ring against the urging force of said compression spring to move said clutch ring to the free position and movable in the opposite direction to permit said follower ring to move said clutch ring to the lock position by the urging force of said compression spring; and
   a connecting coil spring disposed radially concentrically with said compression spring for resiliently connecting said clutch ring with said follower ring, said spring having a substantially constant length during both the lock and free positions of said mechanism.

2. A wheel hub clutching mechanism as set forth in claim 1, wherein said cam means includes a handle rotatably mounted on the outer end of said body and movable between a lock position and a free position and a drum cam integrally provided on said handle to be rotated within said body.

3. A wheel hub clutching mechanism as set forth in claim 2, wherein said follower ring comprises a pair of tabs radially inwardly extended therefrom, fitting closely rotatably and slidably on said drum cam.

4. A wheel hub clutching mechanism as set forth in claim 3, wherein said follower ring includes an annular flange radially outwardly extended therefrom and said clutch ring is engaged at its one end with the flange of the follower ring, said compression spring being engaged at its one end with the flange of said follower ring.

5. A wheel hub clutching mechanism as set forth in claim 4, wherein said follower ring includes a pair of hooks radially inwardly extended therefrom and said connecting coil spring is engaged at its one end with the hooks and at its other end with an inner portion of said clutch ring, said compression coil spring surrounding said connecting coil spring coaxially.

* * * * *